UNITED STATES PATENT OFFICE 2,481,466

1-SUBSTITUTED - 2,5 - DIKETO - 7 - METHYL-PYRIMIDOPYRAZOLES AND PROCESS OF PREPARING THE SAME

Abraham Bavley, Binghamton, N. Y., assignor to General Aniline & Film Corporation, New York, N. Y., a corporation of Delaware No Drawing. Application November 17, 1944, Serial No. 563,974

13 Claims. (Cl. 260—25)

This invention relates to 1-substituted-2,5-diketo-7-methyl-pyrimidopyrazoles and to a process for preparing the same.

It is known in three-color photography that the key image is the blue or blue-green image which is produced in the red-sensitive layer. It has been the practice in the art to produce such images, particularly in color-forming development methods, by the utilization of a phenol. On the other hand, it has been the practice to produce the magenta image by employing compounds which contain a reactive methylene group, usually a pyrazolone. I have now discovered that the reaction products of diketene with a pyrazolone which contains a primary amino group on the carbon atom in 3-position and a substituent on the nitrogen atom in 1-position give blue images on color-forming development despite the fact that such compounds still contain a reactive methylene group and are free from phenolic hydroxyl groups.

This result is surprising, for it was to be expected that the compounds, due to the presence of the reactive methylene group, would react in color-forming development in the same manner as the pyrazolones to produce magenta or purple images.

The compounds which are produced by this reaction are 1-substituted-2,5-diketo-7-methyl-pyrimidopyrazoles. The reaction leading to the formation of these compounds cannot take place by using any amino pyrazolone. On the contrary, it has been ascertained that unless the nitrogen atom in the 1-position be substituted and the primary amino group be in the 3-position, it is impossible to obtain the desired pyrimidopyrazoles. The use of pyrazolones having the aforestated structure is therefore critical to the successful production of the blue color-formers of the present invention.

It is an object of the present invention to prepare 1-substituted-2,5-diketo-7 - methyl - pyrimidopyrazoles useful as color-formers for producing blue dye images by color-forming development.

A further object of the invention is the said pyrimidopyrazoles.

A still further object is to provide photographic developer solutions and emulsions which contain a new class of color-formers for producing blue dye images in situ with photographic images.

Other objects will be apparent by reference to the following specification in which its preferred details and embodiments are described.

The novel compounds of this invention are characterized by a structure corresponding to the general formula:

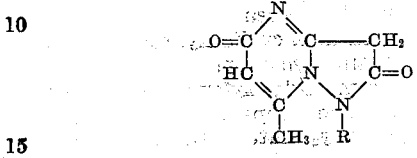

wherein R is an alkyl, e. g., methyl, ethyl, propyl, butyl, octyl, decyl, octadecyl, or an other alkyl radical containing up to 24 carbon atoms, aryl, e. g., phenyl, naphthyl, anthranyl, diphenyl, and the like, aralkyl, e. g., benzyl, methylbenzyl, ethylbenzyl, and the like, heterocyclic nucleus, e. g., benzothiazolyl, α-quinolyl, α-pyridyl and the like. Said alkyl, aryl and aralkyl groups may be substituted by a halogen such as chlorine, bromine, or iodine, amino groups, e. g., primary amino, secondary amino, such as methylamine, phenylamine and the like, or a tertiary amine such as dimethylamine, diphenylamine, etc., sulfoamino or solubilizing groups such as sulfonic or carboxylic acid groups.

According to the present invention, these compounds are prepared by heating one mol of a 3-amino-5-pyrazolone, the 1-position of which is substituted by a radical represented by R above, with 1 to 1½ mols of diketene in the presence of a solvent-diluent, such as, for example, aromatic hydrocarbon, or an oxygenated hydrocarbon at a temperature ranging from 80° C. to 130° C., from 2 hours to 5 hours. Instead of employing a solvent-diluent for the reaction, the reactants may be suspended in water and the aqueous suspension heated at a temperature ranging from 80° C. to 100° C. for the same period of time.

As examples of suitable 1-substituted-3-amino-5-pyrazolones which condense with diketene according to this invention may be mentioned 1-methyl-3-amino-5-pyrazolone, 1-phenyl-3-amino-5-pyrazolone, 1-(2'-benzothiazolyl)-3-amino-5-pyrazolone, 1-(α-quinolyl)-3-amino-5-pyrazolone, 1-(α-pyridyl)-3-amino-5-pyrazolone, 1-β-naphthyl-3-amino-5-pyrazolone, 1-o-tolyl-3-amino-5-pyrazolone. 1-p-chloro-phenyl-3-amino-5-pyrazolone and the like.

Various structural formulae for diketene have been proposed in the literature (Ind. and Eng. Chem., 32, p. 16, 1940). Among the structures proposed are the following:

(1) 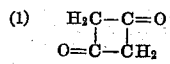  (2) 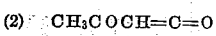

(3) 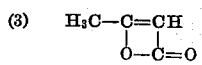  (4) 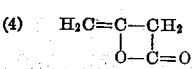

During the experimentation with and the practicing of this invention, I have discovered that the probable structure of diketene is immaterial since the commercially available diketene will condense with a 1-substituted-3-amino-5-pyrazolone to give a product characterized by a structure corresponding to the above general formula.

The 1-substituted-3-amino-5-pyrazolones employed as starting materials may be prepared in various ways. One suitable method which is described by Conrad and Zart in Ber., 39, 2282 (1906) consists of treating ethyl cyanoacetate with phenyl hydrazine, using sodium alcoholate as a condensing agent. Other suitable methods are described in the Jour. of Amer. Chem. Soc., 64, p. 2133, 1942, and United States Patent 2,343,704.

The condensation between the 1-substituted-3-amino-5-pyrazolone and diketene to produce the compounds of the present invention is carried out first, by dissolving the co-reactants in a suitable solvent-diluent such as a cyclic hydrocarbon, for example, cyclohexane, cycloheptane, cyclooctane, benzene, toluene, o, m, and p-xylene, ethylbenzene, 1,2,4-trimethylbenzene, propylbenzene, 1,3-ethylmethylbenzene, an oxygenated hydrocarbon such as, ethyl methyl ketone, diethyl ketone, methyl propyl ketone, allylacetone, mesityl oxide, dioxane and the like, stirring the reaction mixture at room temperature for a period of time ranging from 15 minutes to 1 hour. The reaction mixture is then heated on a steam bath at a temperature ranging from 75° C. to 130° C. for a period of time ranging from 2 hours to 5 hours. The reaction mixture is then cooled, the precipitated product washed with ether and recrystallized from methyl or ethyl alcohol. The ratio of the reactants is one mol of 1-substituted-3-amino-pyrazolone to 1 to 1½ mols of diketene. The desirable ratio of diketene, however, is in the range of 1.2 mols per one mol of 1-substituted-3-amino-pyrazolone.

Of these various classes of solvent-diluents, the aromatic hydrocarbons are by far the most practical, and therefore preferred in view of their relative cheapness. It is to be noted, however, that solvent-diluents other than above mentioned may also be employed, the selection depending more or less on the resistance of the selected solvent-diluent to react with diketene.

Specific compounds which have been prepared by the reactions hereinafter described are the following, it being understood that they are exemplary only and that they may contain other substituent groups as well as those included in these compounds:

1-methyl-2,5-diketo-7-methyl-pyrimidopyrazole
1-ethyl-2,5-diketo-7-methyl-pyrimidopyrazole
1-propyl-2,5-diketo-7-methyl-pyrimidopyrazole
1-phenyl-2,5-diketo-7-methyl-pyrimidopyrazole
1-p-tolyl-2,5-diketo-7-methyl-pyrimidopyrazole
1-o-tolyl-2,5-diketo-7-methyl-pyrimidopyrazole
1-(2'-benzothiazolyl)-2,5-diketo-7-methyl-pyrimidopyrazole
1-(α-quinolyl)-2,5-diketo-7-methyl-pyrimidopyrazole
1-(α-pyridyl)-2,5-diketo-7-methyl-pyrimidopyrazole In general, the compounds of the present invention are water insoluble. Their solubility in water, however, is accomplished by the introduction of suitable solubilizing groups, e. g., sulfonic or carboxylic acid groups into the groups represented by R in the above general formula.

The compounds of the present invention when employed as color-formers may be added to the developer, providing they are not fast to diffusion in gelatin, or to the silver-halide emulsion in the form of a solution or a suspension in a suitable solvent, such as, 1 N-alcoholic sodium or potassium hydroxide, acetone, ethyl alcohol, isopropyl alcohol, etc. Dispersing agents such as isopropylnaphthalene sulfonic acid or any of the dispersing agents disclosed in United States Patent 2,186,717 may be used in preparing the suspension of the water insoluble color-formers for incorporation into developers or silver-halide emulsions. Instead of gelatin, the color-formers may be incorporated in other colloidal materials such as, organic esters of cellulose, super-polyamides, polyesters or other synthetic resins. The emulsion may be carried by a transparent medium such as cellulose esters, super-polyamides, synthetic resins or a non-transparent reflecting medium such as paper, or an opaque cellulose ester. The emulsion may be coated as a single layer on the support, or superposed layers containing the couplers may be coated on one or both sides of the support. The superposed layers may be differentially sensitized for the formation of a color image in the well-known manner.

When incorporating the color-formers into photographic silver-halide emulsions, it is essential that the substituent of the R group in the above general formula be such that it will prevent the color-formers from migrating from one layer to another, otherwise color distortion will result upon color-forming development. Several methods have been proposed to prevent migration of color-formers from silver-halide emulsion layers by rendering such color-formers "fast to diffusion in gelatin." This result may be accomplished in several ways, as for example, by substituting the R group with suitable groups which impart substantive characteristics to the color-formers which combine permanently with the gelatin and other colloidal materials of the silver-halide emulsion, or by enlarging the substituent group of the color-former with a long chain alkyl radical so that the color-former is incapable of diffusing from the gelatin or other colloidal material. Examples of such methods which render color-formers fast to diffusion by imparting substantive characteristics thereto are disclosed in United States Patent 2,179,228. Examples of color-formers which are rendered fast to diffusion by enlarging the substituent group are disclosed in United States Patents 2,175,512; 2,178,612; 2,179,244; 2,179,234; 2,179,238-9; 2,179,344; 2,186,045; 2,186,719; 2,186,732-3-4; 2,186,849; 2,186,851-2; 2,200,306; 2,280,722; 2,292,575; 2,303,928 and 2,307,399. By reference to the latter patents, it will be noted that the color-formers are modified by the inclusion of radicals of resins, polypeptides, hydrogenated ring systems, carbohydrates, long alkyl chains, and by having the substituent radical recur a number of times in the final molecule. It is to be understood that the substituent group of the color-formers of the present invention, in addition to those previously mentioned, include substantive groups or molecular enlarging groups for the purpose of rendering the 2,5-diketo-7-methyl-pyrimidopyrazoles fast to diffusion.

As examples of suitable aromatic primary amino developing agents which may be employed with the color coupling compounds of the present invention, there may be mentioned p-phenylenediamine, mono ethyl-p-phenylenediamine, diethyl-o-phenylenediamine, 4,4'-diaminodiphenylamine, p-aminodialkylaniline, e. g., p-aminodimethylaniline and p-aminodiethylaniline. These developing agents are preferably used in the form of their salts such as the hydrochloride, since they are more soluble and stable than the free base. They are characterized by the presence of a free or primary amino group in the phenyl nucleus which enables the oxidation product of the developer to couple with the color-former to form a dye image in the emulsion adjacent to the individual particles of the silver image. The silver image may be removed by bleaching in the well-known manner to leave the color image in the emulsion.

A suitable developing solution is prepared as follows:

p-Aminodiethylaniline HCl _____grams__ 2.0
Sodium carbonate (anhydrous) _____do____ 50.0
Sodium sulfite (anhydrous) _____do____ 2.0
Potassium bromide _____do____ 0.2
Water to make _____liter__ 1

The exposed silver-halide emulsions are developed in the above solution in the usual manner. A solution or suspension of the color-former is only added to the developing solution where the color-former is not present in the silver-halide emulsion.

The following examples are intended to illustrate the preparation of compounds disclosed above. It will be appreciated that the conditions of reactions, e. g., proportion of reacting ingredients, times of reaction, and temperature, may be varied and that supplementary processes of purification and the like may be resorted to wherever found desirable. These and other variations and modifications will be evident to those skilled in the art in light of the guiding principles disclosed herein.

*Example I*

1-phenyl-2,5-diketo-7-methyl-pyrimidopyrazole

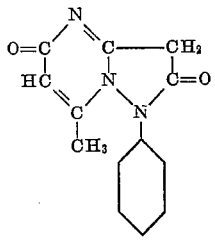

To 4 grams of 1-phenyl-3-amino-5-pyrazolone in 25 cc. of dry xylene, a solution of 3 grams of diketene in 10 cc. of dry xylene was added slowly with constant stirring. The mixture was stirred at room temperature for one-half hour and then heated on a steam bath at 100° C. for 2 hours. The reaction mixture was allowed to cool, the precipitated product filtered and washed several times with ether, and recrystallized from methyl alcohol.

One gram of the above product was dissolved in 20 cc. of ethyl alcohol. Two cc. of the solution was then added to the developing solution and used for the development of an exposed silver-halide emulsion. An excellent blue image was obtained together with the silver image.

*Example II*

1-(p-tolyl)-2,5-diketo-7-methyl-pyrimidopyrazole

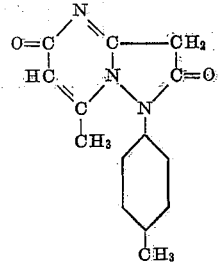

To 4.5 grams of 1-(p-tolyl)-3-amino-5-pyrazolone in 35 cc. of dry xylene, a solution of 4 grams of diketene in 15 cc. of dry xylene was added. The mixture was stirred at room temperature for 45 minutes and then heated on a steam bath at 100° C. for 2½ hours. The reaction mixture was allowed to cool, the precipitated product filtered and washed several times with ether, and recrystallized from methyl alcohol.

One gram of the above product was dissolved in 20 cc. of ethyl alcohol. Two cc. of the solution was then added to the developing solution and used for the development of an exposed silver-halide emulsion. An excellent blue image was obtained together with the silver image.

*Example III*

1-(α-quinolyl)-2,5-diketo-7-methyl-pyrimidopyrazole

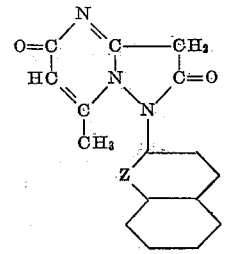

To 11.3 grams of 1-(alpha-quinolyl)-3-amino-5-pyrazolone in 75 cc. of dry xylene, a solution of 5.2 grams of diketene in 20 cc. of dry xylene was added. The mixture was stirred at room temperature for 45 minutes and then heated on a steam bath at 100° C. for 2½ hours. The reaction mixture was allowed to cool, the precipitated product filtered and washed several times with ether, and recrystallized from methyl alcohol.

One gram of the above product was dissolved in 20 cc. of ethyl alcohol. Two cc. of the solution was then added to the developing solution and used for the development of an exposed silver-halide emulsion. An excellent blue image was obtained together with the silver image.

While the present invention has been described in considerable detail with reference to certain preferred procedures, materials and uses, it is to be understood that the class of compounds and their application is not limited thereto, and that all relative modifications and variations are within the scope of the invention as defined by the appended claims.

I claim:
1. Chemical compounds of the general formula:

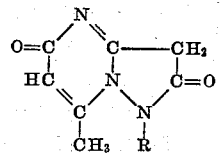

wherein R is selected from the class consisting of alkyl of not more than 24 carbon atoms, aryl, aralkyl and unsubstituted mono-nitrogenous heterocyclic groups.

2. The chemical compound corresponding to the formula:

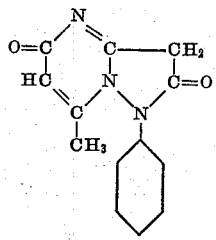

3. The chemical compound corresponding to the formula:

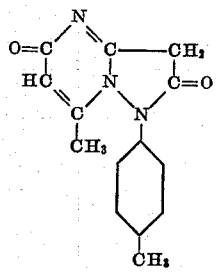

4. The chemical compound corresponding to the formula:

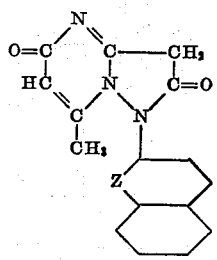

5. The process of producing 1-substituted-2,5-diketo-7-methyl-pyrimidopyrazoles which comprises heating a 1-substituted-3-amino-5-pyrazolone with diketene and recovering the said 1-substituted-2,5-diketo-7-methyl - pyrimidopyrazoles so formed.

6. The process of producing 1-substituted-2,5-diketo-7-methyl-pyrimidopyrazoles which comprises heating one mol of a 1-substituted-3-amino-5-pyrazolone with 1 to 1½ mols of diketene and recovering the said 1-substituted-2,5-diketo-7-methyl-pyrimidopyrazoles so formed.

7. The process of producing 1-phenyl-2,5-diketo-7-methyl-pyrimidopyrazole which comprises heating 1-phenyl-3-amino-5-pyrazolone with diketene and recovering the said 1-phenyl-2,5-diketo-7-methyl-pyrimidopyrazole.

8. The process of producing 1-(p-tolyl)-2,5-diketo-7-methyl-pyrimidopyrazole which comprises heating 1-(p-tolyl)-3-amino-5-pyrazolone with diketene and recovering the said 1-(p-tolyl)-2,5 - diketo-7 - methyl - pyrimidopyrazole.

9. The process of producing 1-(α-quinolyl)-2,5 - diketo - 7 - methyl - pyrimidopyrazole which comprises heating 1 - (α - quinolyl)-3-amino-5-pyrazolone with diketene and recovering the said 1-(α-quinolyl)-2,5-diketo-7 - methyl - pyrimidopyrazole.

10. The process according to claim 5 wherein the heating is conducted in the presence of an inert solvent-diluent, a member selected from the class consisting of water, aromatic hydrocarbons and aliphatic ketones, at a temperature ranging from 75° to 130° C.

11. The process according to claim 7 wherein the ratio of reactants heated is one mol of 1-phenyl-3-amino-5-pyrazole to 1.2 mols of diketene.

12. The process according to claim 8 wherein the ratio of reactants heated is one mol of 1-(p-tolyl)-3-amino-5-pyrazolone to 1.2 mols of diketene.

13. The process according to claim 9 wherein the ratio of reactants heated is one mol of 1-(α-quinolyl)-3-amino-5-pyrazolone to 1.2 mols of diketene.

ABRAHAM BAVLEY.

REFERENCES CITED

The following references are of record in the file of this patent:

UNITED STATES PATENTS

| Number | Name | Date |
| --- | --- | --- |
| 2,303,928 | Frohlich et al. | Dec. 1, 1942 |
| 2,343,703 | Porter | Mar. 7, 1944 |
| 2,343,704 | Porter | Mar. 7, 1944 |
| 2,369,489 | Porter | Feb. 13, 1945 |